United States Patent Office 2,888,476
Patented May 26, 1959

2,888,476

PREPARATION OF LONG-CHAIN ALKYLHALOSILANES

Ernest L. Little, Wilmington, and Gerald M. Whitman, Hockessin, Del., assignors to E. I. du Pont de Nemours and Company, Wilmington, Del., a corporation of Delaware No Drawing. Application August 1, 1956
Serial No. 601,378

10 Claims. (Cl. 260—448.2)

This invention relates to a new process for the preparation of organosilicon compounds and more particularly to the preparation of organohalosilanes.

Within the last few years, organohalosilanes have acquired considerable industrial importance. These products are very reactive and may be hydrolyzed to yield adjuvants for petroleum oils, coating materials for films and after-treating agents for fabrics. The available materials have generally been limited to alkylchlorosilanes containing one to two carbons in the alkyl chain.

Many methods have been proposed for the manufacture of organohalosilanes, each of which has one or more shortcomings. The processes, generally directed to obtaining alkylchlorosilanes, are of limited application, require expensive raw materials, or are difficult to manipulate. In addition, long chain alkylhalosilanes are not readily prepared by the known methods. In one process, for example, powdered silicon containing copper powder is reacted with methyl chloride at an elevated temperature to produce a mixture of methylchlorosilanes. With alkyl halides of longer chain length this process gives low yields of alkylchlorosilanes and forms undesirable decomposition products.

The Grignard synthesis, which has also been used for preparing alkylchlorosilanes, requires either inflammable or rare solvents, exclusion of moisture and the disposal of by-product magnesium salts. In another process, alkylchlorosilanes are prepared by the addition of olefins to silicochloroform at elevated temperatures and pressures. This process is of limited use in bringing about the addition of more than one organic group to the silicon atom. Another method of prepartion utilizes the reaction of an organic chloride and silicon tetrachloride with a suspension of sodium in a liquid hydrocarbon. This process gives a mixture of products including compounds with Si—Si bonds instead of the desired C—Si bonds.

All of the above-mentioned processes yield alkylchlorosilanes of low molecular weight. The prior art processes are, in particular, not satisfactory for the production of alkylhalosilanes with long alkyl side chains. Such silanes are desirable for use as surface active agents, for the preparation of oil-soluble polymers, and particularly as water repellents.

A primary object of the present invention is, consequently, provision of a novel method of synthesizing organohalosilanes.

A more particular object is provision of a method for preparing heretofore-unknown long-chain alkylhalosilanes.

The above-mentioned and yet further objects are achieved in accordance with this invention by reacting an alkyl or cycloalkyl halide with an alkali or alkaline earth metal silicide at a temperature of at least 200° C. and under superatmospheric pressure. In the preferred form of the invention, an alkyl or cycloalkyl chloride or bromide is reacted with sodium or calcium silicide at a temperature lying between 200° and 350° C. under a pressure of at least 50 atmospheres for a period of not less than 8 hours. The process is preferably accomplished in a liquid aliphatic hydrocarbon acting as a solvent for the reactants.

The manipulative steps required for carrying out the process described are very simple. The reactants are charged into an inert vessel of sufficient strength and the latter is closed and heated to the desired temperature for the requisite period. The products are then separated, if desired, generally by fractional distillation. In an alternative procedure, the alkyl or cycloalkyl halide, particularly if it is gaseous, can be charged continuously into a container holding the other reactant and the solvent. The reaction is then carried out otherwise as described above.

The hydrocarbon halides used in the process may be chlorides, bromides or iodides. The hydrocarbon radical of the organic halide may be a straight chain aliphatic (alkyl) or a cycloaliphatic (cycloalkyl) group and may contain from one to eight carbon atoms inclusive. Examples of suitable halides are methyl bromide, ethyl iodide, propyl chloride, isopropyl bromide, butyl iodide, neopentyl chloride, n-hexyl chloride, n-hexyl bromide and 2-ethylhexyl chloride. Other halides suitable for use in this process are cyclopentyl bromide, cyclohexyl chloride, methylcyclohexyl iodide, ethylcyclohexyl chloride and 2,5-dimethylcyclohexyl chloride.

The silicides of alkali and alkaline earth metals may in general be utilized in the invention. Those of sodium, lithium, potassium, caesium, calcium, beryllium, magnesium and strontium are particularly suitable. Since the metal silicide enters into the reaction it should be used in sufficient quantity to provide a good yield of organochlorosilanes. The mole ratio of silicide to the organic halide may be as low as 0.1 and as high as 10.

The hydrocarbon halides used in the process are well known industrial chemicals. The alkali and alkaline earth metal silicides are recognized chemical compounds whose preparation and properties are described by Hohmann in Zeit. anorg. u. allgem. Chem., 257, 113–6 (1948). The prepartion of sodium silicide is described in one of the appended examples.

The temperature required for the reaction lies between about 200° and 500° C. As noted, about 200°–350° C. is preferred.

The pressure may be varied widely but should preferably be at least 50 atmospheres. This pressure may be developed autogenously if desired. An upper limit on pressure is set by the physical strength of the apparatus employed.

The reaction time depends to some extent on the temperature and pressure employed. About 8–24 hours is required to produce a good yield under the preferred temperature and pressure conditions given. Longer periods can be used but do not greatly improve the results.

Employment of a reaction solvent is optional but preferred. Saturated hydrocarbons make the most desirable solvents. Suitable hydrocarbons are n-hexane, n-heptane, n-octane, n-decane, n-dodecane and their branched chain isomers. Cyclic hydrocarbons such as cyclopentane, cyclohexane, methyl cyclohexane, isopropylcyclohexane, and decahydronaphthalene may also be used. In addition, relatively inert aromatic hydrocarbons such as benzene are usable.

The high-boiling liquid organohalosilanes obtained as one of the principal products in the process of this invention have a silicon content lying approximately between 2.0 and 12.0%. The number of hydrocarbon radicals attached to silicon will lie between 1 and 3 inclusive. The number of carbon atoms in the hydrocarbon radicals attached to silicon varies but will generally not be less than 6 or more than 30.

The products of the invention can be hydrolyzed to yield high molecular weight silicones. They can, alternatively, be converted to alkoxy silane derivatives by reaction with alcohols such as methanol, ethanol, propanol, ethylene glycol and hexamethylene glycol. The products are also particularly useful in waterproofing materials, masonry especially.

The following non-limiting examples, in which quantities are given as parts by weight, illustrate various aspects of this invention. Boiling points were taken at atmospheric pressure unless otherwise noted.

Example I

This example shows a preparation of sodium silicide and use of this compound with ethyl chloride in the process of the invention.

(a) A reaction tube is prepared which consists of a six inch section of ¾" stainless steel pipe with a cap threaded to the bottom. The cap for the top end of the tube is a ¾" pipe cap to which one end of a stainless steel tube ¼" in diameter and 8" long is welded. The reaction tube is purged with nitrogen gas and charged with 8 parts of sodium metal and 20 parts of silicon powder. The cap with the stainless steel exit tube is then attached and the reaction vessel suspended in a 2" x 12" tube furnace. A rubber tube serves to connect the stainless exit tube to a glass T-tube, one leg of which is attached to a gas bubbler filled with white oil, the other to a nitrogen tank. The nitrogen flow is adjusted until a slow stream of bubbles appears in the white oil. The tube is heated at 700° C. for 24 hours, cooled to 600° C., maintained at 600° C. for 24 hours and then cooled to room temperature. The tube is removed from the furnace, the top cap removed and benzene added to the contents. The product is transferred to a receptacle and kept under benzene until used. This product, sodium silicide, is a dark gray-black solid which reacts readily with water.

(b) A stainless steel shaker tube (capable of holding 400 parts of water) was charged with 100 parts of ethyl chloride, 20.4 parts of sodium silicide and 80 parts of decane. The reactants were heated at 250° C. and autogenous pressure for 16 hours. Distillation of the reaction products yielded 33.5 parts of a liquid boiling from 95 to 210° C. and 21 parts of a high-boiling liquid residue.

The distilled portion of the reaction products contained 4 parts of a fraction which boiled from 95 to 103° C. and had 23.25% C, 4.13% H, 55.67% Cl and 14.03% Si. It was identified through its infrared spectrum as a mixture of ethyltrichlorosilane and diethyldichlorosilane. Another fraction, boiling at 190–195° C., consisted of 77.02% C, 13.87% H, 8.15% Cl and 3.08% Si. A third fraction, boiling at 202–210° C., consisted of 77.22% C, 13.91% H, 10.73% Cl and 3.84% Si. These analyses show that the portion of the reaction products boiling above about 105° C. was composed of alkylchlorosilanes in which the alkyl chains were longer than those of the alkyl halide used in the preparation.

The undistilled liquid residue contained 52.45% C, 8.80% H, 21.82% Cl and 11.86% Si. These percentages correspond to a C/Si/Cl ratio of 10/1/1.4 and show that alkyl chains substantially longer than ethyl were present in the alkylchlorosilanes.

Example II

This example shows the use of n-butyl bromide in the process of the invention.

The shaker tube of Example I was charged with 110 parts of n-butyl bromide, 60 parts of benzene and 20.4 parts of sodium silicide. It was heated at 250° C. and autogenous pressure for 16 hours. The reaction product was filtered and distilled to yield 94 parts boiling at 69–80° C.; 33 parts boiling at 80–130° C.; and 6 parts boiling at 130–150° C. This last fraction contained 70.54% C, 8.53% H, 18.36% Br and 2.10% Si.

The residue (59 parts), boiling above 150° C., was a liquid which fumed in air and reacted vigorously with water. The infrared spectrum showed the presence of alkyl bromosilanes. This liquid was distilled under reduced pressure to yield 14.4 parts of long-chain alkyl bromosilanes boiling at 82–85° C. (20 mm. of mercury pressure) and containing 31.49% C, 7.50% H, 29.57% Br and 4.80% Si.

Example III

This example shows that the alkylhalosilanes prepared by this invention are effective agents for waterproofing masonry materials.

An ordinary building brick was sawed into eight pieces approximating 2 inch cubes. Each cube possessed an unsawed surface which in the parent brick in a building would normally be exposed to the weather. The unsawed surface was brushed with a 4% solution of an alkylchlorosilane in toluene, the silane having an average molecular formula of $C_{10}H_{21}SiCl_2$. The treated cube was allowed to air dry 24 hours. The treated side of the cube was sealed to one end of a hollow glass cylinder which was 14 inches long by 1.2 inches in diameter and was open at both ends, using a molten 1:1 beeswax:rosin mixture as the cement. A cylinder containing an untreated brick cube was prepared at the same time for a control test.

After 3 hours, water was poured to a height of 12 inches in each cylinder in a vertical position resting on the brick base. The drop in water levels after 24 hours was used as a measure of water-proofness. The following results were obtained:

| Treating agent: | Drop in water level, inches |
|---|---|
| None | 11⅛ |
| $C_{10}H_{21}SiCl_2$ | 1½ |

The organochlorosilanes obtained by this process have also been useful in waterproofing paper and as treating agents for canvas and leather.

The embodiments of the invention in which an exclusive property or privilege is claimed are defined as follows:

1. The process of synthesizing organohalosilanes at least some of which have carbon chains longer than those of the compounds from which they are made which consists of reacting a member of the group consisting of alkyl and cycloalkyl chlorides, bromides and iodides having 1–8 carbon atoms with a silicide of the group consisting of the alkali and alkaline earth metal silicides at a temperature of about 200°–500°C.

2. The process of claim 1 in which the silicide is sodium silicide.

3. The process of claim 1 in which the silicide is calcium silicide.

4. The process of claim 1 in which the halide is ethyl chloride.

5. The process of claim 1 in which the halide is n-butyl bromide.

6. The process of claim 1 in which the temperature is about 200°–350° C.

7. The process of claim 1 in which the pressure is at least about 50 atmospheres.

8. The process of claim 1 in which the pressure is autogenous.

9. The process of claim 1 carried out in the presence of a hydrocarbon solvent.

10. The process of claim 9 in which the solvent is a member of the group consisting of n-decane and benzene.

(References on following page)

References Cited in the file of this patent

UNITED STATES PATENTS

| | | |
|---|---|---|
| 2,413,050 | Hyde | Dec. 24, 1946 |
| 2,488,487 | Barry et al. | Nov. 15, 1949 |
| 2,532,430 | Strother et al. | Dec. 5, 1950 |
| 2,706,724 | Bass | Apr. 19, 1955 |

FOREIGN PATENTS

| | | |
|---|---|---|
| 887,343 | Germany | Aug. 24, 1953 |
| 702,349 | Great Britain | Jan. 13, 1954 |
| 708,823 | Great Britain | May 12, 1954 |

OTHER REFERENCES

Hansen: "Der Aufbau der Zweistofflegierungen," 1943, Edwards Brothers Inc., Ann Arbor, Mich., publishers, pp. 406–7.